United States Patent
Sawada

(10) Patent No.: US 10,573,021 B2
(45) Date of Patent: Feb. 25, 2020

(54) POSITION AND ATTITUDE ESTIMATION METHOD AND POSITION AND ATTITUDE ESTIMATION SYSTEM

(71) Applicant: HONDA MOTOR CO., LTD., Tokyo (JP)

(72) Inventor: Shinji Sawada, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 21 days.

(21) Appl. No.: 15/683,313

(22) Filed: Aug. 22, 2017

(65) Prior Publication Data
US 2018/0089853 A1 Mar. 29, 2018

(30) Foreign Application Priority Data

Sep. 28, 2016 (JP) ................. 2016-190454

(51) Int. Cl.
*G06T 7/70* (2017.01)
*G01B 11/00* (2006.01)
(Continued)

(52) U.S. Cl.
CPC .............. *G06T 7/70* (2017.01); *G01B 11/002* (2013.01); *G01B 11/26* (2013.01); *G06T 7/74* (2017.01); *G06T 2207/30164* (2013.01)

(58) Field of Classification Search
None
See application file for complete search history.

(56) References Cited

U.S. PATENT DOCUMENTS

2006/0290781 A1* 12/2006 Hama ...................... G01C 3/08
348/135

FOREIGN PATENT DOCUMENTS

| JP | 62-175603 | 8/1987 |
|----|-----------|--------|
| JP | 03-092712 | 4/1991 |

(Continued)

OTHER PUBLICATIONS

Japanese Office Action dated May 8, 2018, 3 pages.

*Primary Examiner* — Vu Le
*Assistant Examiner* — Tracy Mangialaschi
(74) *Attorney, Agent, or Firm* — Rankin, Hill & Clark LLP

(57) ABSTRACT

Provided is a position and attitude estimation method and system in which the Z coordinate value of each index point $P_i$ is estimated according to the size $\phi_1$ of each index area $A_i$ of a work W acquired through an imaging device 4 having an optical axis parallel to the Z axis of a real space. Based on the Z coordinate value $Z_i$ of each index point $P_i$, the first real space attitude $\theta_{1(i,j)}$ of an index straight line $Q_{ij}$ passing through paired index points $P_i$ and $P_j$ is estimated. A light beam 20 is irradiated to a first index point $P_{i1}$ among a plurality of index points $P_i$ by using an irradiation device 2, thereby forming and defining a first index area $A_{i1}$, which includes the first index point $P_{i1}$.

14 Claims, 11 Drawing Sheets

(51) Int. Cl.
*G01B 11/26* (2006.01)
*G06T 7/73* (2017.01)

(56) References Cited

FOREIGN PATENT DOCUMENTS

| | | |
|---|---|---|
| JP | 06-259536 | 9/1994 |
| JP | 2534517 | 6/1996 |
| JP | 09-304013 | 11/1997 |
| JP | 2001-227925 | 8/2001 |
| JP | 2001227925 A * | 8/2001 |
| JP | 4602704 | 10/2010 |
| JP | 2013-088169 | 5/2013 |
| JP | 2013088169 A * | 5/2013 |

* cited by examiner

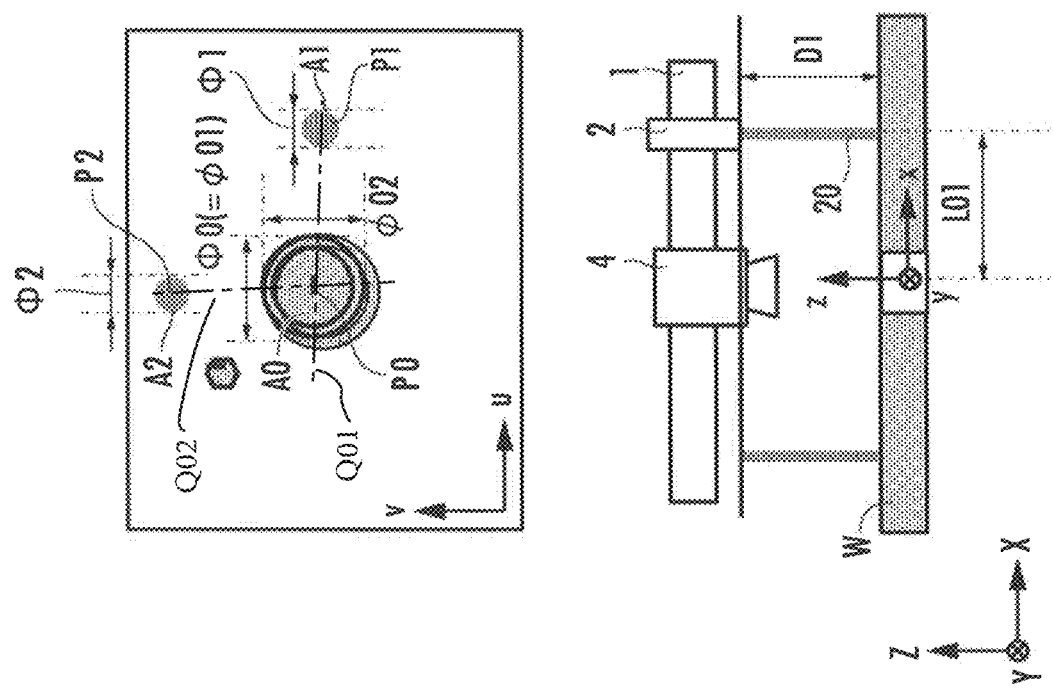

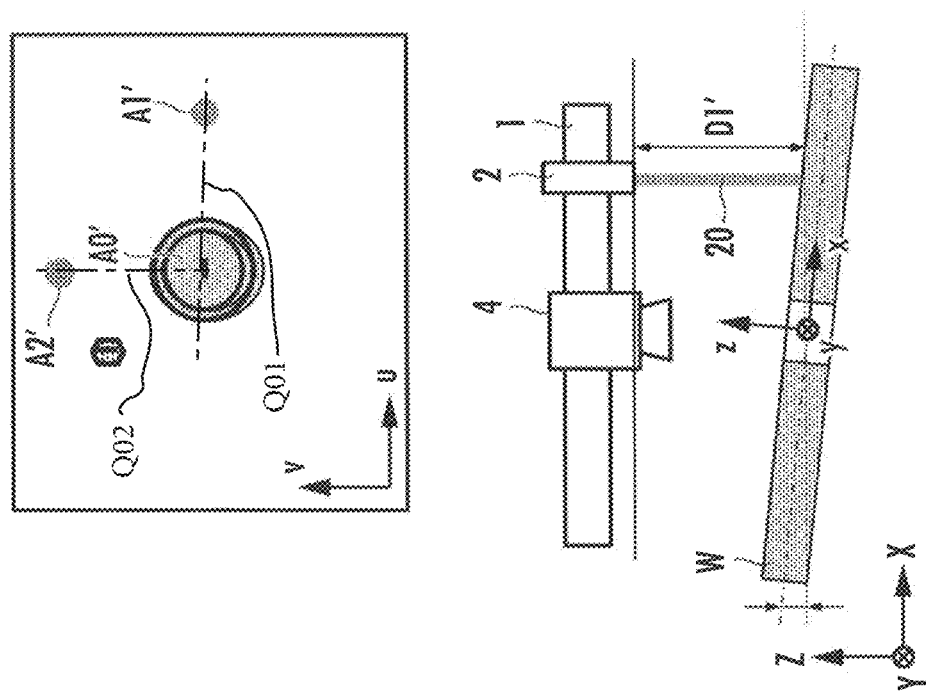

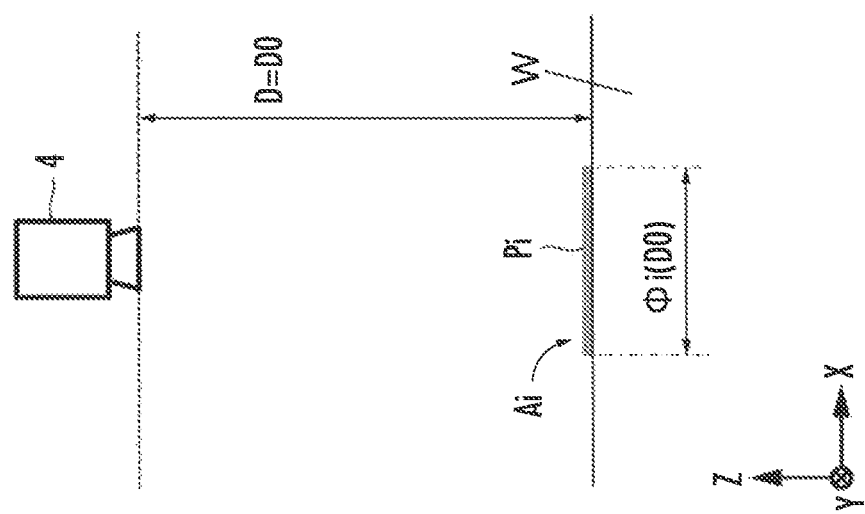

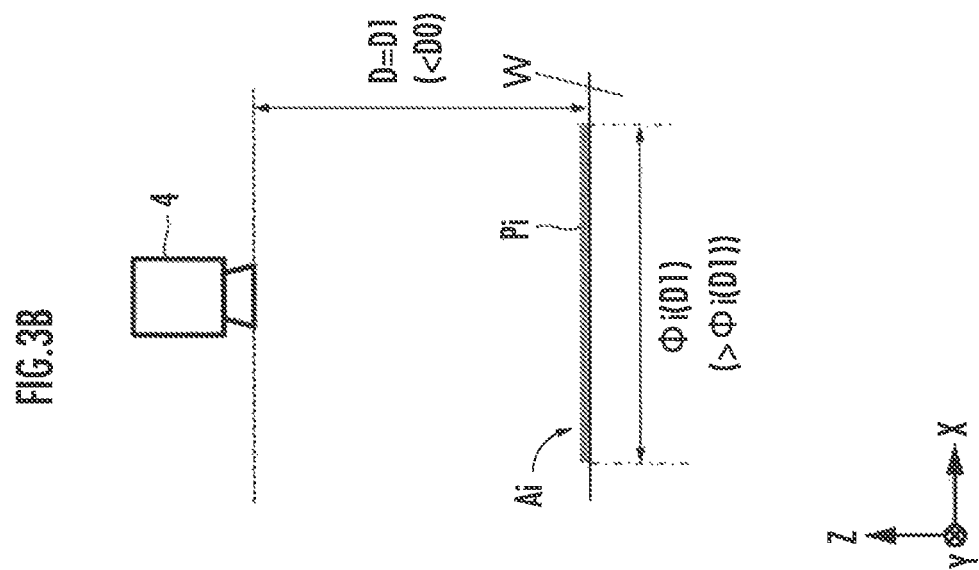

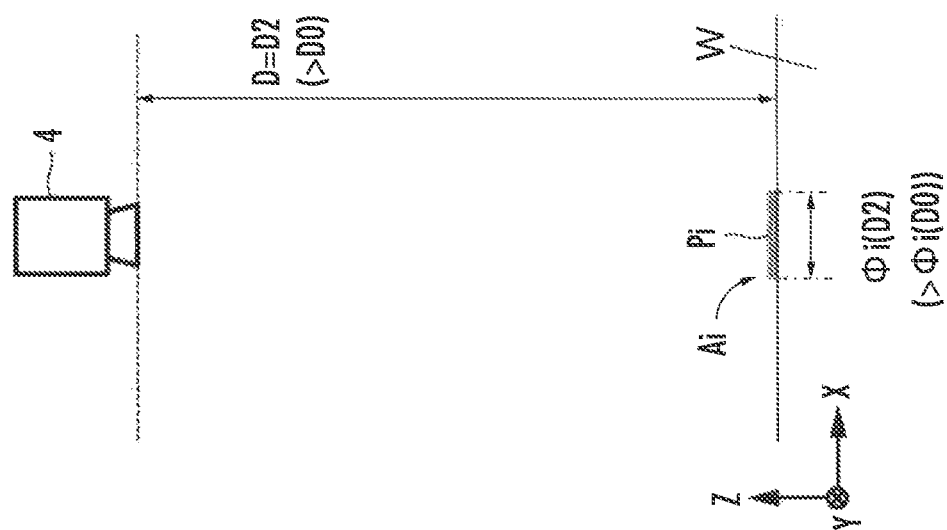

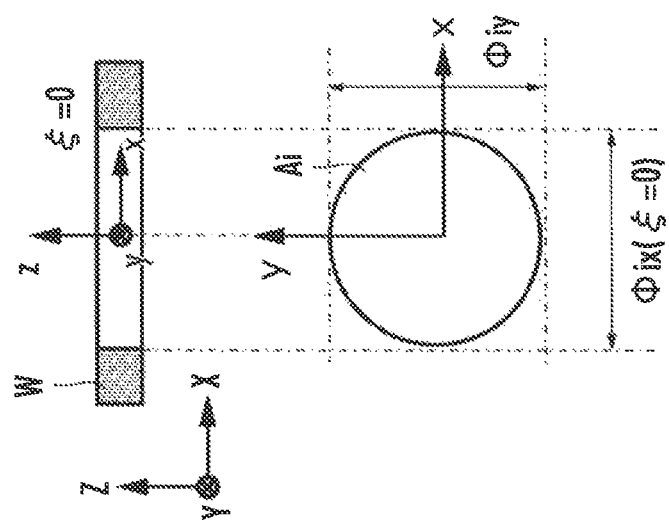

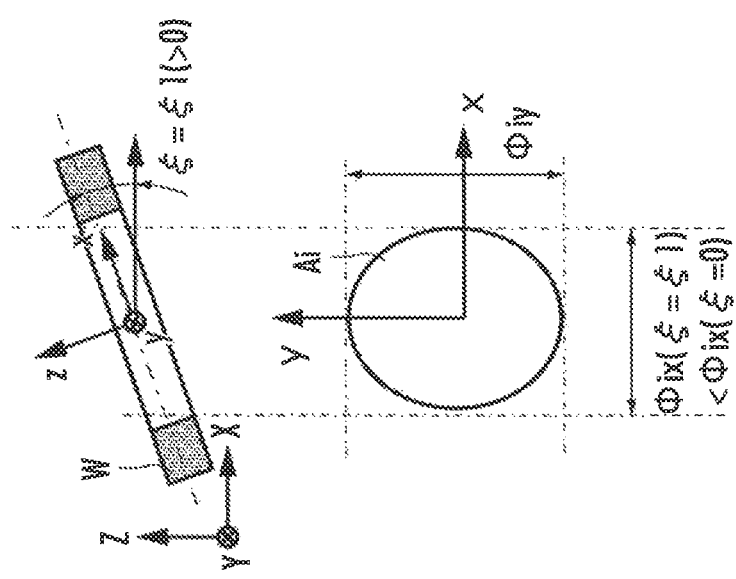

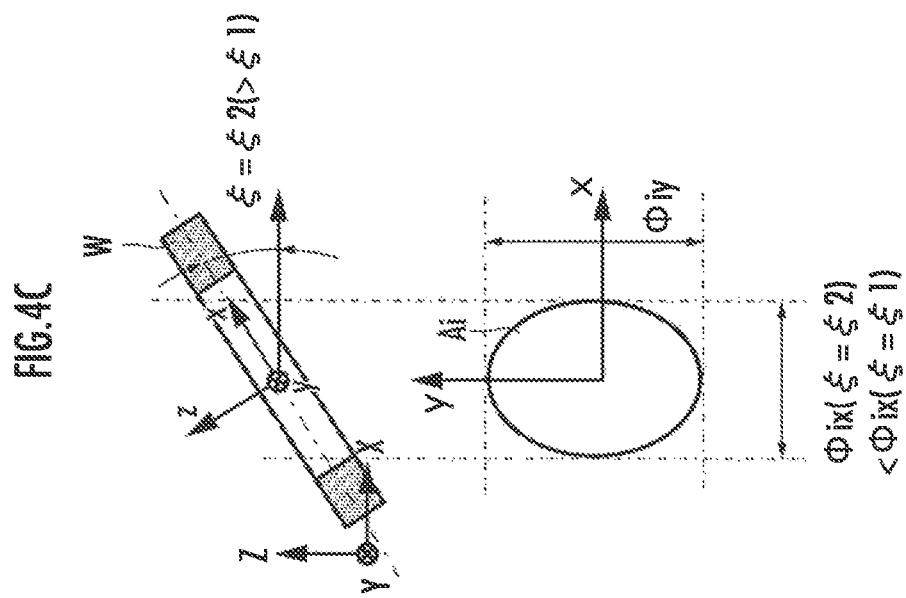

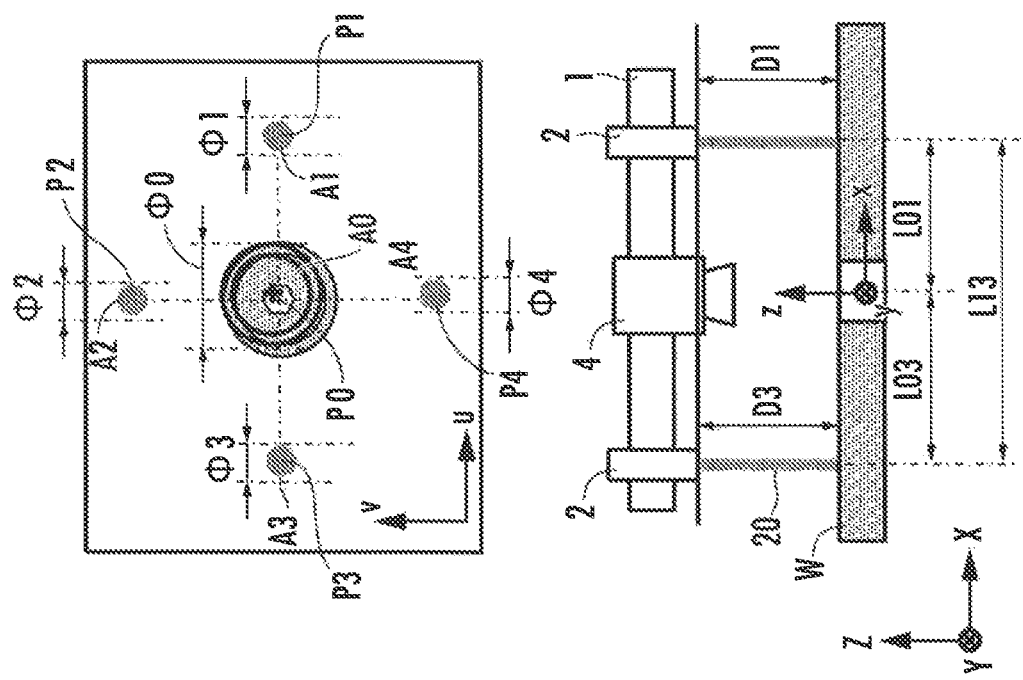

FIG. 5B
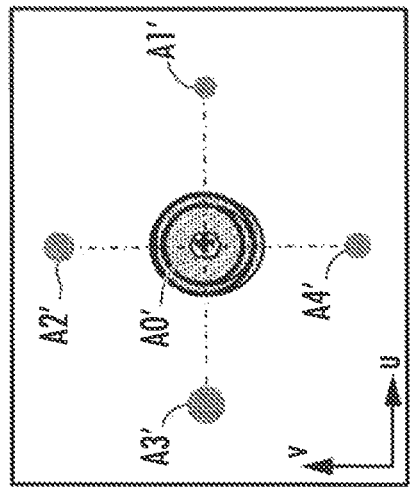
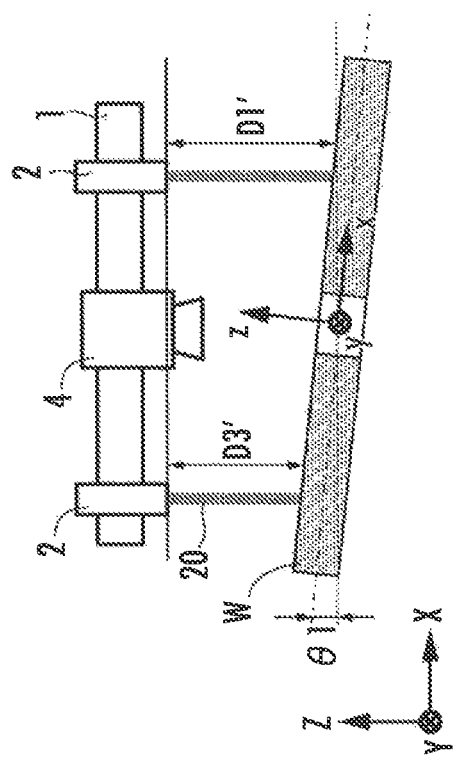

POSITION AND ATTITUDE ESTIMATION METHOD AND POSITION AND ATTITUDE ESTIMATION SYSTEM

BACKGROUND OF THE INVENTION

Field of the Invention

The present invention relates to a method and a system for measuring the position and attitude of an object, such as a work, in a three-dimensional space.

Description of the Related Art

There has been proposed a method for measuring the position of an object by combining a distance measurement sensor with a camera. A method has been proposed, in which the detection results of the positions of known three points on an object obtained by a camera, are subjected to parallax correction based on the distance measurement results of the three points obtained by a distance measurement sensor on a reference surface that is perpendicular to the optical axis of the camera, thereby measuring the three-dimensional positions of the three points, that is, the three-dimensional positions of the object (refer to Japanese Patent Application Laid-Open No. H03-92712). There has been proposed a method for estimating the position and the attitude of a plane on the basis of the measurement results of the X-Y positions of three marks on a plane obtained by a camera and the measurement result of the Z position thereof obtained by a distance measurement sensor (refer to Japanese Patent Application Laid-Open No. H09-304013).

However, using a distance measurement sensor increases the cost of a measurement system. To avoid such an increase in cost, a method has been proposed, in which an imaging device is used in place of a distance measurement sensor to measure the three-dimensional position of an object. There has been proposed a method whereby a plane on which four or more marks, the geometric relationship of which are known, are present is imaged by a camera, and the three-dimensional positions of the plurality of the marks are estimated on the basis of the positions of the plurality of marks on the plane and the positions of the plurality of marks on a two-dimensional image coordinate system (refer to Japanese Patent Application Laid-Open No. S62-175603). There has been proposed another method in which three characteristic points of an object are extracted in a two-dimensional image taken by a camera and the three-dimensional position of the object is measured on the basis of the result of the extraction and the distances among the three characteristic points, which are measured in advance (refer to Japanese Patent No. 2534517). There has been proposed yet another method in which a plurality of marks two-dimensionally arranged in a grid-like manner are imaged by a camera, and the three-dimensional positions of the plurality of marks are estimated according to a predetermined relational expression on the basis of the two-dimensional positions of the plurality of marks obtained by the imaging (refer to Japanese Patent Application Laid-Open No. H06-259536). There has been proposed still another method in which the three-dimensional positions of four marks of an object, the distances among the four marks being measured in advance, are estimated on the basis of the distances in addition to the two-dimensional positions in an image of the object taken by a camera (refer to Japanese Patent No. 4602704).

However, there are cases where, when a component is imaged using an imaging device to check the assembled state of components, a mark provided on the component is at least partly covered by another component or a group of components, thus making it difficult to perform the checking operation.

SUMMARY OF THE INVENTION

Therefore, it is an object of the present invention to provide a technology that makes it possible to estimate the position and the attitude of an object in a three-dimensional coordinate system with ease and high accuracy even in a situation where a part of the object is inconveniently covered by another object.

A position and attitude estimation method in accordance with the present invention includes: first size measurement processing for acquiring a captured image of an object through an imaging device, the position and the attitude of which are fixed in a real space defined by an XYZ coordinate system and an optical axis of which is parallel to a Z-axis, and for measuring a size of each of a plurality of index areas in the captured image, the plurality of index areas being defined in the object; vertical real space position estimation processing for estimating a Z coordinate value of each of a plurality of index points included in each of the plurality of index areas on the basis of a measurement result in the first size measurement processing; first real space attitude estimation processing for estimating, as a first real space attitude, an attitude of an index straight line in a real space, the index straight line passes through paired index points among the plurality of index points, on the basis of at least one of an X coordinate value and a Y coordinate value of each of the plurality of index points and an estimation result of the Z coordinate value of each of the plurality of index points; and real space attitude estimation processing for estimating a real space attitude of the object on the basis of an estimation result of the first real space attitude, wherein, in the first size measurement processing, an irradiation device, which has its position and attitude fixed in the real space, is used to irradiate light beam to a first index point among the plurality of index points, thereby forming a first index area as at least one index area among the plurality of index areas.

According to the position and attitude estimation method in accordance with the present invention, the Z coordinate value of each index point is estimated on the basis of the size of each index area of an object acquired through an imaging device which has an optical axis parallel to the Z-axis in the real space. This relies on a qualitative relationship, in which the measurement size of an index point increases as the index point is closer to the imaging device (or the image pickup element of the imaging device), whereas the measurement size decreases as the index point is farther from the imaging device. Based on the Z coordinate value of each index point, the first real space attitude of an index straight line passing through paired index points (the first real space attitude being dependent upon a directional vector) is estimated. The first index area which includes the first index point is formed and defined by irradiating a light beam to the first index point among the plurality of index points by using the irradiation device.

In an imaging range of an imaging device, even in a situation where a part of an object is covered by another object, the first index area is formed by irradiating the light beam to the first index point of the object, avoiding the aforesaid another object or threading through a gap. A plurality of index areas including the plurality of index points on the same index straight line can be easily included in a captured image. Hence, even in such a situation, the real space position defined by at least the Z coordinate value of an object and the real space attitude of the object defined by at least the first real space attitude of an index straight line can be estimated with ease and high accuracy.

Preferably, the position and attitude estimation method in accordance with the present invention further includes second size measurement processing for measuring the size of at least one index area among the plurality of index areas in an extending direction of the index straight line in the captured image; and second real space attitude estimation processing for estimating, as a second real space attitude, the real space attitude of at least one index area on the basis of a measurement result in the second size measurement processing, wherein the estimation result of the first real space attitude and the estimation result of the second real space attitude are consolidated by the real space attitude estimation processing, thereby estimating the real space attitude of the object.

According to the position and attitude estimation method, the second real space attitude of at least one index area in the captured image (dependent upon the perpendicular vector of the index area) is estimated on the basis of the size of the index area in the extending direction of the index straight line. The estimation result of the first real space attitude and the estimation result of the second real space attitude are consolidated, thereby improving the accuracy of estimating the real space attitude of an object.

In the position and attitude estimation method according to the present invention, preferably, the estimation results of the first real space attitudes of the plurality of index straight lines which pass through index points constituting each of different pairs and which are the same or parallel to each other are consolidated to estimate the real space attitude of the object in the real space attitude estimation processing.

The position and attitude estimation method improves the accuracy of the estimation of the real space attitude of each of a plurality of index straight lines passing through index points constituting different pairs, thus leading to higher accuracy of the estimation of the real space attitude of an object.

In the position and attitude estimation method according to the present invention, the plurality of index points are preferably set such that two specified directions that are orthogonal to each other in the real space are defined.

According to the position and attitude estimation method, the real space attitude of an object that is defined by the first real space attitude (or the consolidated result of a plurality of estimation results of the first real space attitude or the consolidated result of the first real space attitude and the second real space attitude) of each of two index straight lines orthogonal to each other in a real space is estimated.

Preferably, the position and attitude estimation method according to the present invention further includes horizontal real space position estimation processing for estimating an X coordinate value and a Y coordinate value of a second index point on the basis of the position of the second index point in the captured image among the plurality of index points, the second index point being fixed to an object coordinate system.

According to the position and attitude estimation method, the X coordinate value and the Y coordinate value of the second index point are estimated on the basis of the position of the second index point in the captured image, the second index point being fixed in the object coordinate system. With this arrangement, the real space position of an object defined by the estimation results of the X coordinate value and the Y coordinate value in addition to the estimation result of the Z coordinate value of the second index point is estimated with high accuracy.

In the position and attitude estimation method according to the present invention, a point included in the second index area defined by a profile that can be recognized in the object through the imaging device preferably is defined as the second index point.

The position and attitude estimation method improves the accuracy of estimating the real space position and the real space attitude of an object by improving the accuracy of measuring the position of the second index point in a captured image.

Preferably, the position and attitude estimation method according to the present invention further includes: first preparation processing for measuring a change in the size of at least one index area in the captured image of the object while changing the Z coordinate value of the at least one index point among the plurality of index points, thereby defining, as a first correlation, the correlation between the Z coordinate value of the at least one index point and the size of the at least one index area in the captured image, wherein the Z coordinate value of each of the plurality of index points is estimated according to the first correlation in the vertical real space position estimation processing.

According to the position and attitude estimation method, the Z coordinate value of each index point is estimated according to the first correlation defined in advance, thus improving the accuracy of estimating the real space position and the real space attitude of an object.

Preferably, the position and attitude estimation method according to the present invention further includes: second preparation processing for measuring a change in the size of the at least one index area in the captured image in an extending direction of the index straight line while changing the real space attitude of the at least one index area, thereby defining, as a second correlation, the correlation between the real space attitude of the at least one index area and the size thereof in the extending direction of the index straight line in the captured image, wherein the second real space attitude is estimated according to the second correlation in the second real space attitude estimation processing.

According to the position and attitude estimation method, the second real space attitude is estimated according to the second correlation defined in advance, so that the accuracy of estimating the real space position and the real space attitude of an object is improved.

BRIEF DESCRIPTION OF THE DRAWINGS

FIG. 1A presents explanatory diagrams related to a captured image of an object, the irradiation of a light beam; and an imaging mode in a reference state (the first embodiment);

FIG. 2B presents explanatory diagrams related to a captured image of an object, the irradiation of a light beam, and an imaging mode in a randomly chosen state (the first embodiment);

FIG. 3A is an explanatory diagram related to a first correlation;

FIG. 3B is another explanatory diagram related to the first correlation;

FIG. 3C is yet another explanatory diagram related to the first correlation;

FIG. 4A is an explanatory diagram related to a second correlation;

FIG. 4B is another explanatory diagram related to the second correlation;

FIG. 4C is yet another explanatory diagram related to the second correlation;

FIG. 5A presents explanatory diagrams related to a captured image of an object, the irradiation of a light beam, and an imaging mode in a reference state (a second embodiment); and FIG. 5B presents explanatory diagrams related to a captured image of an object, the irradiation of a light beam, and an imaging mode in a randomly chosen state (the second embodiment).

DESCRIPTION OF TIM PREFERRED EMBODIMENTS

First Embodiment

Figure 1:
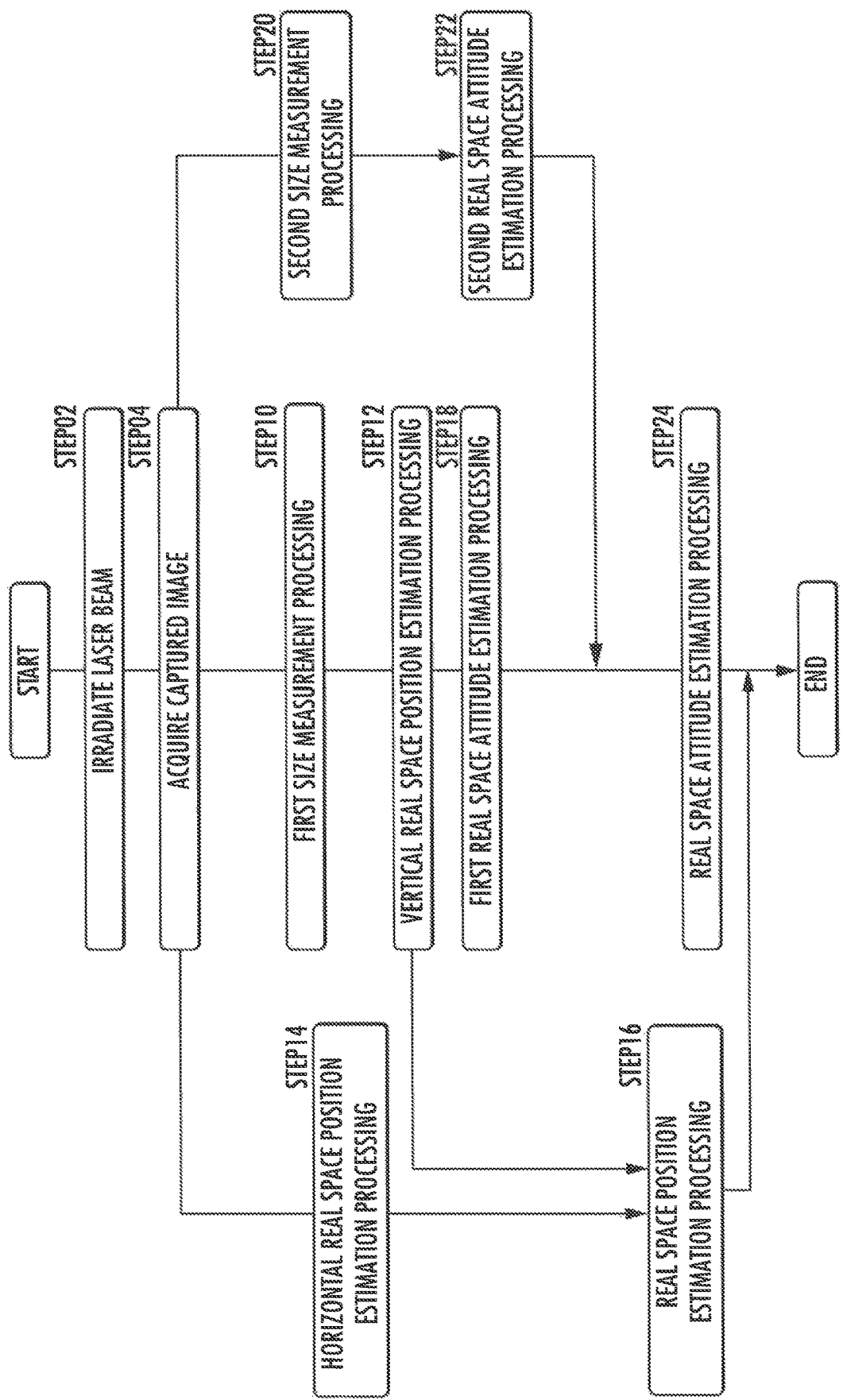
FIG. 1 is a flowchart related to the position and attitude estimation method as a first embodiment of the present invention.

According to the position and attitude estimation method as a first embodiment of the present invention, the position and the attitude of an object coordinate system (x, y, z) in a real space coordinate system (X, Y, Z) are estimated as the real space position and the real space attitude of a work W (object) (refer to the lower diagram of FIG. 2A, the lower diagram of FIG. 2B, the lower diagram of FIG. 5A, and the lower diagram of FIG. 5B), For the estimation, an irradiation device 2 and an imaging device 4 are used to estimate the position and the attitude of the work W in a real space. The position and the attitude of the irradiation device 2 in the real space are retained by a base 1 such that the optical axis of a light beam 20 (laser beam) of the irradiation device 2 is parallel to a Z-axis. The position and the attitude of the imaging device 4 in the real space are retained by the base 1 such that the optical axis of the imaging device 4 is parallel to the Z-axis.

The work W is, for example, a component to be assembled to another work disposed such that the position and the attitude thereof in the real space are maintained to be constant. When the work W has been assembled to another work, the position and attitude estimation method in accordance with the present invention is carried out to evaluate the difference of each of the real space position and the real space attitude thereof from each of a desired position and a desired attitude.

By maintaining the real space position and the real space attitude of the irradiation device 2 to be constant, an X coordinate value $X_i$ and a Y coordinate value $Y_i$ of a first index point among a plurality of index points $P_i$ (i=0, 1, 2, . . . N) are specified in advance. The position of a second index point in an object coordinate system is fixed. In the first embodiment, a plurality of index straight lines passing through paired index points $P_i$ and $P_j$ are non-parallel to each other. For example, as illustrated in the upper diagram of FIG. 2A and the upper diagram of FIG. 2B, a first index straight line $Q_{01}$ (coinciding with the x-axis in this case), which passes through index points $P_0$ and $P_1$, and a second index straight line $Q_{02}$ (coinciding with the y-axis in this case), which passes through the index point $P_0$ and an index point $P_2$, intersect at right angles at the index point $P_0$.

The position and attitude estimation method in accordance with the present invention is implemented by processors (e.g. single core processors or multicore processors) constituting a computer, which read necessary data and software from a memory in the processor or from an external memory and carry out arithmetic processing on the data according to the software. For example, each processing element working as a functional element that carries out the processing in each step illustrated in FIG. 1 is composed of a processor.

The first size measurement processing element may have a function for controlling the operation of the imaging device 4 in addition to the operation of a drive mechanism (which is composed primarily of a motor and a power transmission mechanism) for adjusting the position and attitude of the imaging device 4 in the real space defined by an XYZ coordinate system. The first size measurement processing element may have a function for controlling the operation of the irradiation device 2 in addition to the operation of a drive mechanism for adjusting the position and attitude of the irradiation device 2 (or the base 1).

A first preparation processing element may have a function for controlling the operation of a drive mechanism for adjusting the relative positions or the relative positions and attitudes of the imaging device 4 and the work W (object) order to change the Z coordinate value of at least one index point P among a plurality of index points.

A second preparation processing element may have a function for controlling the operation of a drive mechanism for adjusting the relative attitudes or the relative positions and attitudes of the imaging device 4 and the work W (object) in order to change the real space attitude of at least one index area.

Using the irradiation device 2, the light beam 20 is irradiated to a first index point $P_{i1}$ among the plurality of index points $P_i$ of the work W (STEP02 of FIG. 1). Thus, the light beam is irradiated simultaneously or at different times to, for example, each of the first index points $P_1$ and $P_2$ ($i_1$=1, 2) illustrated in the upper diagram of FIG. 2A and the upper diagram of FIG. 2B. As a result, approximately circular irradiation areas are formed and defined as first index areas $A_1$ and $A_2$ on the surface of the work W. The shapes of the irradiation areas of the light beam 20 may be other shapes, such as approximately elliptical shapes, or annular shapes, such as toric shapes, instead of the approximately circular shapes. If the shapes of the irradiation areas are toric, then an area having the toric profile may be defined as a first index area $A_{i1}$.

An area derived from the appearance or the structure of the work W that can be identified in a captured image that has been acquired by the imaging device 4 is defined as a second index area $A_{i2}$, and a point included in the second index area $A_{i2}$, such as a central point of the second index area $A_{i2}$ or a point on the boundary line of the second index area $A_{i2}$, is defined as a second index point $P_{i2}$. The second index point $P_{i2}$ has its position fixed in the object coordinate system because of the nature of the second index point $P_{i2}$. In the example illustrated in FIG. 2A and FIG. 2B, the central point of a second index area $A_0$ ($i_2$=0) defined by the rim of an opening formed in the work W is defined as the second index point $P_0$. In the first embodiment, an index straight line $Q_{i1i2}$ is defined such that the index straight line $Q_{i1i2}$ passes through the paired first index point $P_{i1}$ and second index point $P_{i2}$. The plurality of index points $P_i$ may include a plurality of second index points $P_{i2}$. All of the plurality of index points $P_i$ may be defined as the first index points $P_{i1}$ and the light beam 20 may be irradiated to all the index points $P_i$.

Subsequently, the captured image of the work W is acquired through the imaging device 4 (STEP04 of FIG. 1). Thus, the captured images of the work W, which include the index areas $A_0$ to $A_2$, are acquired, as illustrated in, for example, the upper diagram of FIG. 2A and the upper diagram of FIG. 2B.

Based on the captured images, the first size measurement processing is carried out to measure a size $\phi_i$ (or the diameter) of the index area $A_i$ in an image coordinate system (STEP10 of FIG. 1). Alternatively, as the first size measurement processing, the size $\phi_i$ of the index area $A_i$ in the extending directions of the index straight lines in the captured images may be measured, as with second size measurement processing, which will be discussed hereinafter (refer to STEP20 of FIG. 1).

Further, the vertical real space position estimation processing is carried out to estimate the Z coordinate value $Z_i$ (Z coordinate value) of the index point $P_i$ on the basis of the measurement result of the size $\phi_i$ of the index area $A_i$ in the image coordinate system (u, v) (STEP12 of FIG. 1). For example, as conceptually illustrated in FIG. 3A to FIG. 3C, there is a correlation (a first correlation) between an interval $D_i$, which is the interval between the imaging device 4 (or the pickup element of the imaging device 4) and the index point $P_i$, and the size $\phi_i$, which is the size of the index area $A_i$ in a captured image. More specifically, as the interval $D_i$ decreases, the size $\phi_i$ increases (i.e. as the interval D between the imaging device 4 and the index point $P_i$ increases, the size $\phi_i$ of the index area $A_i$ in the captured image decreases). Hence, the Z coordinate value $Z_i$ of the index point $P_i$ corresponding to the interval $D_i$ can be estimated according to the first correlation on the basis of the size $\phi_i$ of the index area $A_i$ in the image coordinate system (u, v).

Based on the captured image, the horizontal real space position estimation processing is carried out to measure an X coordinate value $X_{i2}$ and a Y coordinate value $Y_{i2}$ of a second index point $P_{i2}$ in the real space on the basis of the position $(u_{i2}, v_{i2})$ of the second index point $P_{i2}$ in an image coordinate system (u, v) (STEP14 of FIG. 1). Thus, based on, for example, the position $(u_0, v_0)$ of the second index point $P_0$ ($i_2$=0) in the image coordinate system, an X coordinate value $X_0$ and a Y coordinate value $Y_0$ are measured (refer to the upper diagram of FIG. 2A and the upper diagram of FIG. 2B).

The real space position $(X_{i2}, Y_{i2}, Z_{i2})$ of the second index point $P_{i2}$ is estimated as the real space position of the work W by carrying out the real space position estimation processing on the basis of the result of the vertical real space position estimation processing (refer to STEP12 of FIG. 1) and the result of the horizontal real space position estimation processing (refer to STEP14 of FIG. 1) related to the second index point $P_{i2}$ (refer to STEP16 of FIG. 1). Thus, for example, the real space position $(X_0, Y_0, Z_0)$ of the second index point $P_0$ ($i_2$=0), which is the representative point of the work W, is estimated (refer to FIG. 2A and FIG. 2B).

Based on the result of the vertical real space position estimation processing (refer to STEP10 of FIG. 1), first real space attitude estimation processing is carried out STEP18 of FIG. 1). More specifically, the real space attitude of an index straight line $Q_{ij}$ passing through paired index points $P_i$ and $P_j$ among the plurality of index points $P_i$ is estimated as a first real space attitude on the basis of the X coordinate value $X_i$ and the Y coordinate value $Y_i$ (a known value for the first index point, while an estimated value for the second index point), and the estimation result of the Z coordinate value $Z_i$ of each index point $P_i$. For example, based on a directional vector $(a_{i1}, b_{i1}, c_{i1})$ of the index straight line $Q_{ij}$, each of an angle $\theta_{1X(i,j)}$ of the index straight line $Q_{ij}$ relative to the X-axis of the real space ($\theta_{1x(i,j)}$=arctan $(c_{i1}/a_{i1})$) and an angle $\theta_{1Y(i,j)}$ of the index straight line $Q_{ij}$ relative to the Y-axis of the real space ($\theta_{1Y(i,j)}$=arctan $(c_{i1}/b_{i1})$) is estimated as the first real space attitude $\theta_{1(i,j)}$.

The first real space attitude $\theta_{1(i,j)}$ may be estimated according to relational expression (01) on the basis of a difference $\Delta Z_j(k)$ of a Z coordinate value $Z_j(k)$ of the index point $P_j$ in a randomly chosen state, in which the attitude of an xy plane of the object coordinate system with respect to an XY plane of the real space is unknown, from a Z coordinate value $Z_i(0)$ of the index point $P_i$ in a reference state, in which the attitude of the xy plane of the object coordinate system with respect to the XY plane of the real space is the reference attitude (e.g. parallel). The Z coordinate value $Z_i(0)$ of the index point $P_i$ may be measured in advance after the attitude of the xy plane of the object coordinate system with respect to the XY plane of the real space is adjusted to the reference attitude.

$$\theta_{1(i,j)}=\arctan\{(\Delta Z_j(k)-\Delta Z_i(k))/L_{ij}\} \quad (01)$$

For example, in the state illustrated in the lower diagram of FIG. 2A, the x-axis is parallel to the X-axis, and the y-axis is parallel to the Y-axis. In this state, it is estimated that the xy plane of the object coordinate system is parallel to the XY plane of the real space, and the first real space attitude $\theta_{1(0,1)}$ of the first index straight line (the x-axis line) and the first real space attitude $\theta_{1(0,2)}$ of the second index straight line (y-axis line) with respect to the XY plane are both zero.

In contrast to the above, in the state illustrated in the lower diagram of FIG. 2B, the xy plane of the object coordinate system is inclined in relation to the XY plane of the real space. In this state, the first real space attitude $\theta_{1(0,1)}$ of the first index straight line and the first real space attitude $\theta_{1(0,2)}$ of the second index straight line are estimated according to relational expression (01) on the basis of the Z coordinate value $Z_i(k)$ of the index point $P_i$ (the result of the vertical real space position estimation processing).

Based on the captured image, the second size measurement processing is carried out to measure the size of at least one index area among the plurality of index areas $A_i$ in the extending direction of the index straight line in the image coordinate system (STEP20 of FIG. 1). Thus, for example, the sizes $\phi_{01}$ and $\phi_{02}$ of the second index area $A_2$ in the captured image in the extending directions of the first index straight line $Q_{01}$ (corresponding to the x-axis of the object coordinate system) and the second index straight line $Q_{02}$ (corresponding to the y-axis of the object coordinate system) are measured (refer to the upper diagram of FIG. 2A and the upper diagram of FIG. 2B).

Subsequently, based on the measurement result in the second size measurement processing, the second real space attitude estimation processing is carried out to estimate the real space attitude of at least one index area $A_i$ as the second real space attitude (STEP22 of FIG. 1). Based on a perpendicular vector $(a_{i2}, b_{i2}, c_{i2})$ of the index area $A_i$, each of an angle $\theta_{2X(i,j)}$ of the index straight line $Q_{ij}$ relative to the X-axis of the real space ($\theta_{2x(i,j)}$=arctan $(c_{i2}/a_{i2})$) and an angle $\theta_{2Y(i,j)}$ of the index straight line $Q_{ij}$ relative to the Y-axis of the real space ($\theta_{2Y(i,j)}$=arctan $(c_{i2}/b_{i2})$) is estimated as the second real space attitude $\theta_{2(i,j)}$.

For example, there is a correlation (a second correlation) between a tilt angle $\xi$ of the index straight line $Q_{01}$ with respect to the XY plane of the real space (corresponding to the x-axis of the object coordinate system in this example) and a size $\phi_{ij}(\xi)$ of the index area $A_i$ in the image coordinate system in the extending direction of the index straight line (the x direction in this example). According to the correlation, the size $\phi_{01}(\xi)$ decreases, as illustrated in the lower diagrams of FIG. 4A to FIG. 4C as the tilt angle $\xi$ increases, as illustrated in the upper diagrams of FIG. 4A to FIG. 4C. Therefore, the second real space attitude $\theta_{2(i, j)}$ can be estimated according to the second correlation on the basis of the size $\phi_{ij}$ of the index area $A_i$ in the image coordinate system (u, v) in the extending direction of the index straight line $Q_{ij}$.

The second real space attitude $\theta_{2(i, j)}$ is estimated according to relational expression (02) on the basis of a difference $\Delta\phi_{ij}$ (k) of the size $\phi_{ij}$ ($\xi(k)$)) of the index area $A_i$ in a randomly chosen state, in which the attitude of the xy plane of the object coordinate system relative to the XY plane of the real space is unknown, from the size $\phi_{ij}$ ($\xi(0)$) of the index area $A_i$ in the reference state, in which the attitude of the xy plane of the object coordinate system with respect to the XY plane of the real space is the reference attitude (e.g. parallel). The size $\phi_{ij}$ ($\xi, (0)$) of the index area $A_i$ may be measured in advance after the attitude of the xy plane of the object coordinate system with respect to the XY plane of the real space is adjusted to the reference attitude.

$$\theta_{2(i, j)} = \arccos\{(\Delta\phi_{ij}(k)/\phi_{ij}(k)\} \quad (02)$$

The real space attitude estimation processing is carried out (STEP24 of FIG. 1) on the basis of the results of the first real space attitude estimation processing (refer to STEP10 of FIG. 1) and the second real space attitude estimation processing (refer to STEP22 of FIG. 1). More specifically, the real space attitude $\theta_{(i, j)}$ of the work W is estimated according to relational expression (04) on the basis of the first real space attitude $\theta_{1(i, j)}$ and the second real space attitude $\theta_{2(i, j)}$ estimated as described above.

$$\theta_{(i, j)} = \alpha\theta_{1(i, j)} + (1-\alpha)\theta_{2(i, j)} \quad (0<\alpha<1) \quad (04)$$

A weight coefficient $\alpha$ is set to, for example, 0.5, but may be changed, as necessary, according to the difference in accuracy of estimation between the first real space attitude $\theta_{1(i, j)}$ and the second real space attitude $\theta_{2(i, j)}$. For example, if the recognition accuracy of the first index area derived from light beam in a captured image is higher than the recognition accuracy of the second index area derived from the structure or the appearance of the work W, then the $\alpha$ may be set to a value that is larger than 0.5.

Second Embodiment

The position and attitude estimation method as a second embodiment of the present invention differs from the first embodiment in that the second size measurement processing (refer to STEP20 of FIG. 1) and the second real space attitude estimation processing (refer to STEP22 of FIG. 1) are omitted.

According to the second embodiment, a plurality of index straight lines $Q_{ij}$ and $Q_{i'j'}$ are disposed in parallel to each other or are the same straight line. For example, as illustrated in the upper diagram of FIG. 5A and the upper diagram of FIG. 5B, a first index straight line $Q_{01}$ (i=0, j=1) passing through index points $P_0$ and $P_1$, and a third index straight line $Q_{03}$ (i'=0, j'=1) passing through the index points $P_0$ and an index point $P_3$ are the same straight line (corresponding to an x-axis of an object coordinate system). Similarly, a second index straight line $Q_{02}$ (i=0, j=2) passing through index points $P_0$ and $P_2$, and a fourth index straight line $Q_{04}$ (i'=0, j'=4) passing through the index point $P_0$ and an index point $P_4$ are the same straight line (corresponding to a y-axis of the object coordinate system). A light beam is irradiated to each of the four index points $P_1$ to $P_4$ defined as the first index points thereby to form and define first index areas $A_1$ to $A_4$ (refer to STEP02 of FIG. 1).

First size measurement processing, vertical real space position estimation processing, and first real space attitude estimation processing (refer to STEP10→STEP12→STEP18 in FIG. 1) are carried out to estimate the angles of a plurality of index straight lines $Q_{i1j1}$ to $Q_{iMjM}$ (M=2, 3, . . . ), which are parallel to each other (or the same straight line) with respect to an XY plane as first real space attitudes $\theta_{1(i1, j1)}$ to $\theta_{1(iM, jM)}$. Then, based on the plurality of first real space attitudes $\theta_{1(i1, j1)}$ to $\theta_{1(iM, jM)}$, real space attitude estimation processing is carried out according to relational expression (06) (refer to STEP24 of FIG. 1).

$$\theta = \Sigma_{m=1-M}\beta_m\theta_{1(im, jm)} (0<\beta_m<1, \Sigma\beta_m=1) \quad (06)$$

For example, in a reference state illustrated in the lower diagram of FIG. 5A, the first real space attitudes $\theta_{1(0, 1)}$ to $\theta_{1(0, 4)}$ of the first to the fourth index straight lines with respect to the XY plane are estimated to be zero (refer to the lower diagram of FIG. 2A). Meanwhile, in a randomly chosen state illustrated in the lower diagram of FIG. 5B, an angle $\theta_X$ of the x-axis line of the object coordinate system with respect to the XY plane of the real space is estimated to be $(\theta_{1(0, 1)}+\theta_{1(0, 3)})/2$ ($\beta_{01}=\frac{1}{2}$, $\beta_{03}=\frac{1}{2}$), and an angle $\theta_y$ of the y-axis line of the object coordinate system with respect to the XY plane of the real space is estimated to be $(\theta_{1(0, 2)}+\theta_{1(0, 4)})/2$ ($\beta_{02}=\frac{1}{2}$, $\beta_{04}=\frac{1}{2}$).

(Effect of the Present Invention)

According to the position and attitude estimation method in accordance with the present invention, the Z coordinate value of each index point $P_i$ is estimated on the basis of the size $\phi_i$ of each index area $A_i$ of the work W acquired through the imaging device 4 having the optical axis parallel to the Z-axis of the real space (refer to STEP04→STEP10→STEP12 of FIG. 1, and FIG. 2A and FIG. 2B). This relies on the qualitative relationship, in which the measurement size of the index point $P_i$ increases as the index point $P_i$ is closer to the imaging device 4 (or the image pickup element of the imaging device 4), whereas the measurement size decreases as the index point $P_i$ is farther from the imaging device 4 (refer to FIG. 3A to FIG. 3C). Based on the Z coordinate value of each index point $P_i$, the first real space attitude $\theta_{1(i, j)}$ of the index straight line $Q_{ij}$ passing through paired index points $P_i$ and $P_j$ (the first real space attitude being dependent upon a directional vector) is estimated (refer to STEP18→STEP24 of FIG. 1 and relational expression (04)). The first index area $A_{i1}$, which includes the first index point $P_{i1}$, is formed and defined by irradiating the light beam 20 to the first index point $P_{i1}$ among the plurality of index points $P_i$ by using the irradiation device 2 (refer to STEP02 of FIG. 1, the upper diagram of FIG. 2A, the upper diagram of FIG. 2B, the upper diagram of FIG. 5A, and the upper diagram of FIG. 5B).

In the imaging range of the imaging device 4, even in the situation where a part of the work W is covered by another object, the first index area $A_{i1}$ is formed by irradiating the light beam 20 to the first index point $P_{i1}$ of the work W, avoiding the aforesaid another object or threading through a gap. A plurality of index areas $A_i$ including the plurality of index points $P_i$ on the same index straight line can be easily included in a captured image. Hence, even in such a situation, it is possible to easily estimate, with high accuracy, the real space position defined by at least the Z coordinate value $Z_i$ of the work W and the real space attitude of the work W defined by at least the first real space attitude $\theta_{1(i, j)}$ of the index straight line $Q_{ij}$.

According to the first embodiment, the second real space attitude $\theta_{2(i, j)}$ of at least one index area $A_i$ in a captured image (dependent upon the perpendicular vector of the index area $A_i$) is estimated on the basis of the size $\phi_{i,j}$ of the index area $A_i$ in the extending direction of the index straight line (refer to STEP20→STEP22 of FIG. 1 and relational expression (02)). The estimation result of the first real space attitude $\theta_{1(i,j)}$ and the estimation result of the second real space attitude $\theta_{2(i,j)}$ are consolidated, thereby improving the accuracy of estimating the real space attitude $\theta_{(i,j)}$ of the work W (refer to STEP24 of FIG. 1 and relational expression (04)).

According to the second embodiment, in the real space attitude estimation processing (refer to STEP24 of FIG. 1), the estimation results of the first real space attitudes $\theta_{1(im,jm)}$ of the plurality of index straight lines $Q_{i_1j_1}$ to $Q_{iMjM}$, which pass through index points constituting each of different pairs and which are the same or parallel to each other, are consolidated to estimate the real space attitude $\theta_{(i,j)}$ of the work W (refer to relational expression (06)). Thus, the estimation accuracy is improved over the case where the real space attitude $\theta_{(i,j)}$ of the work W is estimated on the basis of only the first real space attitude $\theta_{1(im,jm)}$ of a single index straight line.

Other Embodiments

In the foregoing embodiments, the horizontal real space position estimation processing (refer to STEP14 of FIG. 1) may be omitted. In this case, the estimation result of the Z coordinate value $Z_i$ of at least one index point $P_i$ or a consolidated result thereof is adopted as the estimation result of the real space position of the work W.

As with the second embodiment, a plurality of index points $P_i$ may be defined, and the angle of an index straight line $Q_{13}$ (corresponding to the x-axis of the object coordinate system) passing through a first pair of second index points $P_1$ and $P_3$, and the angle of an index straight line $Q_{24}$ (corresponding to the y-axis of the object coordinate system) passing through a second pair of second index points $P_2$ and $P_4$ with respect to the X-axis and the Y-axis may be estimated as first real space attitudes $\theta_{1(1,3)}$ and $\theta_{1(2,4)}$, and then the attitude of the work W may be estimated according to the same procedure as that of the first embodiment of the present invention.

In the foregoing embodiments, the first preparation processing may be carried out in advance. More specifically, the change in the size $\phi_k$ of at least one index area $A_k$ in a captured image of the work W is measured while changing the Z coordinate value $Z_k$ of at least one index point $P_k$ among the plurality of index points $P_i$, thereby defining the correlation between the Z coordinate value $Z_k$ and the size $\phi_k$ as the first correlation. Thus, the Z coordinate value $Z_i$ of each index point $P_i$ is estimated according to the first correlation in the vertical real space position estimation processing (STEP12 of FIG. 1).

In the foregoing embodiments, the second preparation processing may be carried out in advance. More specifically, the change in the size $\phi_{ij}$ of at least one index area $A_i$ in a captured image in the extending direction of the index straight line $Q_{ij}$ is measured while changing the real space attitude $\theta_{(i,j)}$ of that particular index area $A_i$, thereby defining the correlation between the real space attitude $\theta_{(i,j)}$ and the size $\phi_{ij}$ in the captured image in the extending direction of the index straight line $Q_{ij}$ as the second correlation. Thus, the second real space attitude $\theta_{2(i,j)}$ is estimated according to the second correlation in the second real space attitude estimation processing (refer to STEP22 of FIG. 1).

What is claimed is:

1. A position and attitude estimation method comprising:
   first size measurement processing for acquiring a captured image of an object through an imaging device, the position and the attitude of which are fixed in a real space defined by an XYZ coordinate system and an optical axis of which is parallel to a Z-axis, and for measuring a size of each of a plurality of index areas in an image coordinate system of the captured image, the plurality of index areas being defined in the object;
   vertical real space position estimation processing for estimating a Z coordinate value of each of a plurality of index points included in each of the plurality of index areas based on a measurement result in the first size measurement processing;
   first real space attitude estimation processing for estimating, as first real space attitudes, an attitude of each of a plurality of non-parallel index straight lines in a real space, the plurality of non-parallel index straight lines respectively pass through different paired index points among the plurality of index points, based on at least one of an X coordinate value and a Y coordinate value of each of the plurality of index points, and an estimation result of the Z coordinate value of each of the plurality of index points;
   second size measurement processing for measuring a size of at least one index area in an extending direction of each of the plurality of non-parallel index straight lines in the captured image, said at least one index area being any one of the plurality of index areas; and
   second real space attitude estimation processing for estimating, as a second real space attitude, a real space attitude of said at least the one index area based on a measurement result in the second size measurement processing; and
   real space attitude estimation processing for estimating a real space attitude of the object based on an estimation result of the first real space attitudes and an estimation result of the second real space attitude, wherein the estimation result of the first real space attitudes and the estimation result of the second real space attitude are consolidated to estimate the real space attitude of the object in the real space attitude estimation processing,
   wherein, in the first size measurement processing, an irradiation device, the position and the attitude of which are fixed in the real space, is used to irradiate light beam to a first index point among the plurality of index points, thereby forming a first index area as at least one index area among the plurality of index areas.

2. The position and attitude estimation method according to claim 1,
   wherein the estimation results of the first real space attitudes of the plurality of non-parallel index straight lines which respectively pass through different index points constituting each of different pairs and which are same or parallel to each other are consolidated to estimate the real space attitude of the object in the real space attitude estimation processing.

3. The position and attitude estimation method according to claim 1,
   wherein the plurality of index points are set such that two specified directions that are orthogonal to each other in the real space are defined for the plurality of non-parallel index straight lines.

4. The position and attitude estimation method according to claim 1, further comprising:
   horizontal real space position estimation processing for estimating an X coordinate value and a Y coordinate value of a second index point based on the position of the second index point in the captured image, the second index point being fixed to an object coordinate system among the plurality of index points.

5. The position and attitude estimation method according to claim 4,
wherein a point included in a second index area defined by a profile that can be recognized in the object through the imaging device is defined as the second index point.

6. The position and attitude estimation method according to claim 1, further comprising:
first preparation processing for measuring a change in the size of the at least one index area in the captured image of the object while changing the Z coordinate value of the at least one index point among the plurality of index points, thereby defining, as a first correlation, the correlation between the Z coordinate value of the at least one index point and the size of the at least one index area in the captured image,
wherein the Z coordinate value of each of the plurality of index points is estimated according to the first correlation in the vertical real space position estimation processing.

7. The position and attitude estimation method according to claim 1, further comprising:
second preparation processing for measuring a change in the size of the at least one index area in the captured image in the extending direction of each of the plurality of non-parallel index straight lines while changing the real space attitude of the at least one index area thereby to define, as a second correlation, the correlation between the real space attitude of the at least one index area and the size thereof in the extending direction of each of the plurality of non-parallel index straight lines in the captured image,
wherein the second real space attitude is estimated according to the second correlation in the second real space attitude estimation processing.

8. A position and attitude estimation system comprising at least one processor configured to operate as:
a first size measurement processing element which acquires a captured image of an object through an imaging device, the position and the attitude of which are fixed in a real space defined by an XYZ coordinate system and which has an optical axis parallel to a Z-axis, and which measures a size of each of a plurality of index areas in an image coordinate system of the captured image, the plurality of index areas being defined in the object;
a vertical real space position estimation processing element which estimates a Z coordinate value of each of a plurality of index points included in each of the plurality of index areas based on a measurement result obtained by the first size measurement processing element;
a first real space attitude estimation processing element which estimates, as a first real space attitudes, an attitude of each of a plurality of non-parallel index straight lines in a real space, the plurality of non-parallel index straight lines respectively pass through different paired index points among the plurality of index points, based on at least one of an X coordinate value and a Y coordinate value of each of the plurality of index points and an estimation result of the Z coordinate value of each of the plurality of index points;
a second size measurement processing element which measures a size of at least one index area in an extending direction of each of the plurality of non-parallel index straight lines in the captured image, said at least one index area being any one of the plurality of index areas;
a second real space attitude estimation processing element which estimates, as a second real space attitude, a real space attitude of said at least one index area based on a measurement result by the second size measurement processing element; and
a real space attitude estimation processing element which estimates a real space attitude of the object based on an estimation result of the first real space attitudes and an estimation result of the second real space attitude, wherein the real space attitude estimation processing element consolidates the estimation result of the first real space attitudes and the estimation result of the second real space attitude, thereby estimating the real space attitude of the object,
wherein, the first size measurement processing element uses an irradiation device, the position and the attitude of which are fixed in the real space, to irradiate light beam to a first index point among the plurality of index points, thereby forming a first index area as at least one index area among the plurality of index areas.

9. The position and attitude estimation system according to claim 8,
wherein the real space attitude estimation processing element consolidates estimation results of the first real space attitudes of the plurality of non-parallel index straight lines which respectively pass through different index points constituting each of different pairs and which are same or parallel to each other, thereby estimating the real space attitude of the object.

10. The position and attitude estimation system according to claim 8,
wherein the plurality of index points are set such that two specified directions that are orthogonal to each other in the real space are defined for the plurality of non-parallel index straight lines.

11. The position and attitude estimation system according to claim 8, wherein the at least one processor is further configured to operate as:
a horizontal real space position estimation processing element which estimates an X coordinate value and a Y coordinate value of a second index point based on the position of the second index point in the captured image among the plurality of index points, the second index point being fixed to an object coordinate system.

12. The position and attitude estimation system according to claim 11,
wherein a point included in the second index area defined by a profile that can be recognized in the object through the imaging device is defined as the second index point.

13. The position and attitude estimation system according to claim 8, wherein the at least one processor is further configured to operate as:
a first preparation processing element which measures a change in the size of at least one index area in the captured image of the object while changing the Z coordinate value of the at least one index point among the plurality of index points, thereby defining, as a first correlation, the correlation between the Z coordinate value of the at least one index point and the size of the at least one index area in the captured image, wherein the vertical real space position estimation processing element estimates the Z coordinate value of each of the plurality of index points according to the first correlation.

14. The position and attitude estimation system according to claim 8, wherein the at least one processor is further configured to operate as:
a second preparation processing element which measures a change in the size of the at least one index area in the captured image in the extending direction of each of the plurality of non-parallel index straight lines while changing the real space attitude of the at least one index area, thereby defining, as a second correlation, the correlation between the real space attitude of the at least one index area and the size thereof in the extending direction of each of the plurality of non-parallel index straight lines in the captured image,
wherein the second real space attitude estimation processing element estimates the second real space attitude according to the second correlation.

* * * * *